(12) United States Patent
Shea et al.

(10) Patent No.: US 7,401,150 B2
(45) Date of Patent: Jul. 15, 2008

(54) JOINT CONSUMPTION OF CONTENT INVITATION METHODS AND APPARATUS

(75) Inventors: Matthew T. Shea, Bellevue, WA (US); Michael J. Cooper, Renton, WA (US)

(73) Assignee: WildTangent, Inc., Redmond, WA (US)

( * ) Notice: Subject to any disclaimer, the term of this patent is extended or adjusted under 35 U.S.C. 154(b) by 61 days.

(21) Appl. No.: 10/572,183

(22) PCT Filed: Sep. 17, 2004

(86) PCT No.: PCT/US2004/030503

§ 371 (c)(1), (2), (4) Date: Mar. 16, 2006

(87) PCT Pub. No.: WO2005/029270

PCT Pub. Date: Mar. 31, 2005

(65) Prior Publication Data

US 2007/0055728 A1   Mar. 8, 2007

Related U.S. Application Data

(60) Provisional application No. 60/504,336, filed on Sep. 19, 2003.

(51) Int. Cl.
*G06F 13/00* (2006.01)

(52) U.S. Cl. ............... 709/229; 709/204; 709/205; 709/206; 463/42

(58) Field of Classification Search ......... 709/204–206, 709/226, 229; 463/42; 715/753–759
See application file for complete search history.

(56) References Cited

U.S. PATENT DOCUMENTS

| 5,907,324 A * | 5/1999 | Larson et al. ............... 715/753 |
| 6,807,562 B1 | 10/2004 | Pennock et al. |
| 2002/0086732 A1 | 7/2002 | Kirmse et al. |
| 2003/0217135 A1 | 11/2003 | Chatani et al. |
| 2004/0210659 A1* | 10/2004 | Taylor ........................ 709/227 |
| 2005/0181878 A1 | 8/2005 | Danieli et al. |

* cited by examiner

*Primary Examiner*—Kenneth R. Coulter
(74) *Attorney, Agent, or Firm*—Schwabe, Williamson & Wyatt, P.C.

(57) ABSTRACT

A joint consumption of content invitation management function is described herein. In various embodiments, the invitation management function is adapted to conditionally extends the invitations to a recipient device (150) to join an inviter device (200) to jointly consume content, via IM (110).

21 Claims, 6 Drawing Sheets

JOINT CONSUMPTION OF CONTENT INVITATION METHODS AND APPARATUS

RELATED APPLICATIONS

The present application is a non-provisional application of provisional applications No. 60/504,336, entitled "Instant Messaging Limited Invitation and Guest Mode" filed on Sep. 19, 2003. The present application claims priority to said '336 provisional application, and incorporates its specification by reference, to the extent the specification is consistent with the specification of this non-provisional application.

FIELD OF THE INVENTION

Embodiments of the present invention relate to the field of electronic data/information processing. More specifically, some embodiments relate to methods and apparatuses for managing invitations of non-owner players to participate in multi-user games, to assist in the spreading and adoption of the games.

BACKGROUND OF THE INVENTION

Advances in microprocessor and related technology have lead to widespread development and the adoption of computing devices. Computing powers that used to be available only in expensive mainfne computers requiring special operating environments are now available in many personal computing devices. The form factors vary from desktop, laptop, palm sized and so forth. A number of these computing devices are packaged as "special purpose" devices, such as set top boxes, entertainment personal digital assistants ("PDA"), pagers, text messengers, smart appliances and wireless mobile phones.

Concurrently, advances in networking, telecommunications and related technologies, in particular, in the area of wireless networking/communications, have lead to increased connectivity between the computing devices, over local, private, wide area, and/or public networks. Of particular notoriety is the Internet public network.

To facilitate communications between a wide range of devices, various electronic means of communications, such as electronic mails, instant messages, and so forth have been developed. Instant messaging ("IM") protocols and services have been implemented by a variety of service providers, such as America On-Line's AIM protocol and Microsoft's MSN Instant Messenger protocol. Both services have a large number of subscribers.

At the same time, these and other related factors contributed to the availability of rich content and functionality available from a variety of devices, including sophisticated games employing complex 3-D graphics to provide realistic rendering of game scenes. Recently, this availability of connected devices has made significant advances in the area of the joint consumption of multi-media content, including online multi-user gaming.

However, these IM protocols and services do not specify ways to integrate the IM with joint multi-user content consumption, including online multi-player gaming. There is no indication of how IM protocols or services could initiate such joint multi-user content consumption, including online multi-player gaming. Further, the capability of IM protocols and services have been under exploited for the advancement and adoption of content, including games, in particular, online multi-user games.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, a joint consumption of content invitation management function, a inviter device equipped with the invitation management function. In various embodiments, the invitation management function manages invitation of non-owner invitees to participate in the joint consumption of the content (e.g. online multi-user games), leveraging on the capabilities of IM, to assist in the spreading and adoption of the content. In various embodiments, the initiation and launching of the joint consumption of content is also integrated and leveraged on the IM capabilities.

For ease of understanding, the descriptions will be primarily presented in the context of online multi-user gaming, and embodiments having the invitation management function being implemented on the client device. However, as alluded to above, the invention is not so limited, and may be practiced to initiate, launch and assist in the spreading and adoption of other contents. The term "content" as used herein is to be broadly construed, including but are not limited to audio, video, and other multi-media content. Further, the invitation management function may be implemented on other devices, e.g. the IM provider server.

Various aspects of the these embodiments will be described using terms commonly employed by those skilled in the art to convey the substance of their work to others skilled in the art. Reference will be made to the accompanying drawings which form a part hereof wherein like numerals designate like parts throughout, and in which are shown, by way of illustration, specific embodiments in which the invention may be practiced. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

The various operations will be described as multiple discrete operations in turn, in a manner that is most helpful to understanding the illustrative embodiments of the present invention. However, the order of description should not be construed to imply that these operations are necessarily order dependent In particular, these operations may not be performed in the order of presentation.

The phrase "in one embodiment" is used repeatedly. The phrase generally does not refer to the same embodiment; however, it may. The terms "comprising", "having" and "including" are synonymous, unless the context dictates otherwise. The term "server" may be a hardware or a software implementation, unless the context clearly indicates one implementation over the other.

Figure 1:
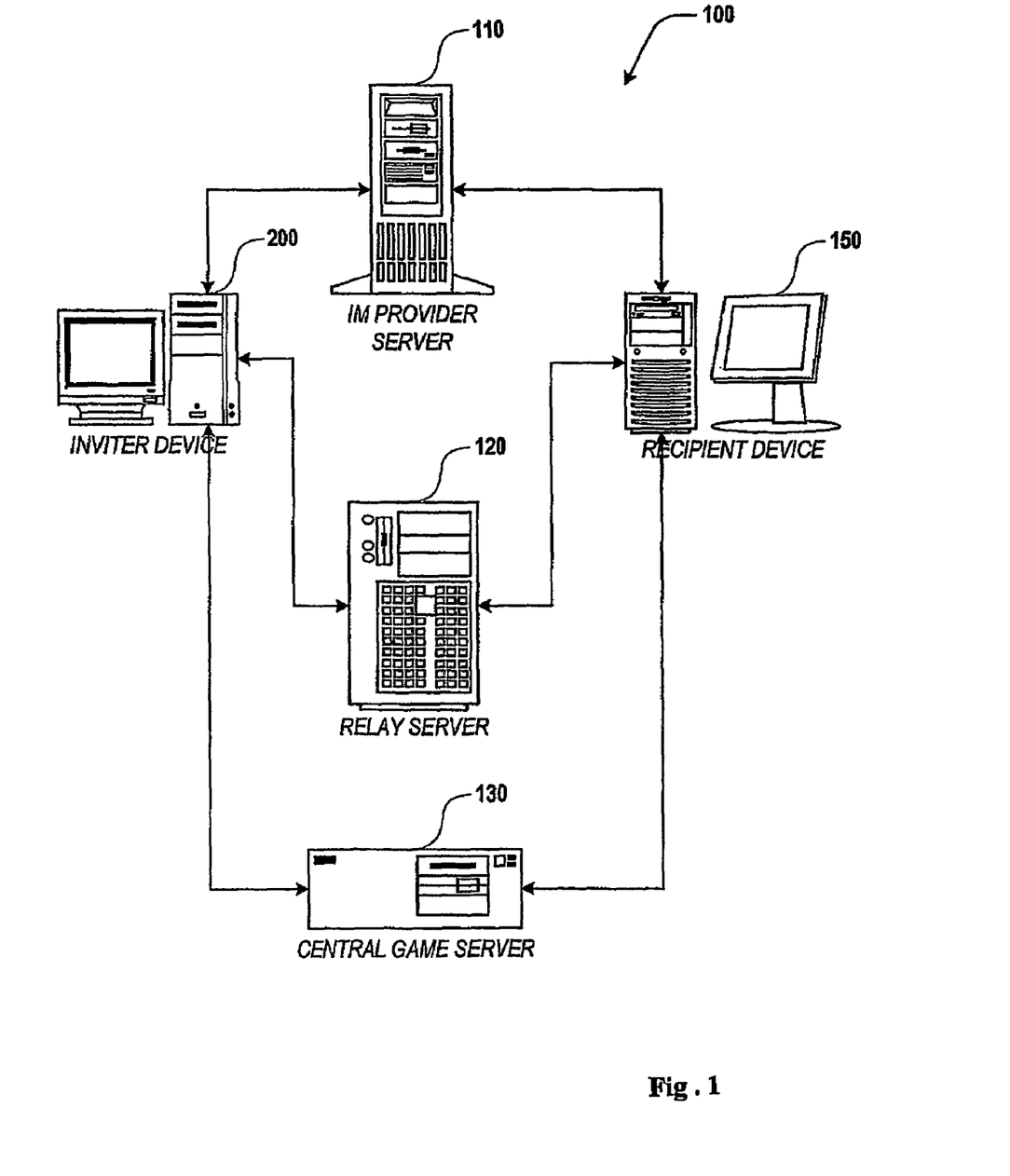
FIG. 1 illustrates a system view of an example operating environment incorporated with the teachings of the present invention, in accordance with one embodiment, including an inviter device adapted to manage joint consumption of content invitations.

Referring now to FIG. 1, wherein an overview of an example operating environment incorporated with the teachings of the present invention, in accordance with one embodiment, is shown. The operating environment may also be considered and/or referred to as a system or a cluster of systems. As illustrated, example operating environment 100 includes inviter device 200, IM provider server 110, relay server 120, central game server 130 and recipient device 150 operationally coupled to each other. In alternate embodiments, operating environment 100 may exclude relay server 120 and/or central game server 130.

As will be described in more detail below, inviter device 200, relay server 120, central game server 130 and recipient device 150 are adapted to leverage on the IM services provided by IM provider server 110 to initiate and launch online multi-user games. Further, inviter device 200 is adapted to include an online multi-user game invitation management function for managing invitation of recipient device 150 to participate in online multi-user games. In particular, the invitation management function is adapted to enable inviter device 200 to invite, in accordance with a set of invitation policies, recipient devices 150, who may not yet be owners of the games, to participate.

Typically, the invitation policies are set by the game developers, and downloaded onto the inviter device 200. As a result, the game developers may leverage on the capability of IM to assist in the spread and adoption of the games.

IM provider server 110, relay server 120 and central game server 130 represent a broad range of these devices known in the art. Thus, except for the manner these servers are used to practice the various embodiments of the present invention, they will not otherwise be further described.

As will be described in more detail below, in addition to being adapted with games and game control mechanism, for the embodiments, inviter device 200 is further adapted to include an invitation management function to manage extension of invitations by inviter devices 200 to recipient devices 150, via IM. In various embodiments, to facilitate provision of the invitation management function, inviter device 200 is further adapted to store (or otherwise have access to) one or more (remote) data structures collectively or correspondingly describing the invitation policies to be employed to manage invitation extensions for one or more contents. In various embodiments, the invitation policies may set forth the limits for the number of invitations an inviter device 200 may extend to recipient devices 150. In various embodiments, one or more limits may be specified for each content. The limit or limits may be for a time period, and/or recipient device specific, to be described more fully below. One exemplary embodiment of an inviter device 200 will be further described below, referencing FIG. 2.

The communication protocols/methods for communication between inviter device 200, IM provider server 110, and recipient device 150, with or without the employment of relay server 120 or central game server 130 will be further described later referencing FIGS. 3, 5 and 6.

Still referring to FIG. 1, in various embodiments, the inviter device 200, IM provider server 110, relay server 120, central game server 130 and recipient device 150 are coupled to each other wirelessly, i.e., they are members of a wireless network. In other embodiments, the inviter device 200, IM provider server 110, relay server 120, central game server 130 and recipient device 150 are coupled to each other as members of a wire-based or mixed wireless and wire-based network. Regardless of the manner the devices are coupled to each other, for various embodiments, inviter device 200, IM provider server 110, relay server 120 and recipient device 150 are equipped to operate in accordance with the at least one IM protocol, if needed. In various embodiments, recipient device 150 may be an inviter device 200 and operate in the role of an inviter to initiate one or more gaming sessions of one or more games. Thus, the terms "inviter device" and "recipient device", as used herein, for the purpose of this specification, including the claims, shall be interpreted with the meaning of an appropriately equipped device, operating a corresponding one of the inviter or recipient role.

Figure 2:
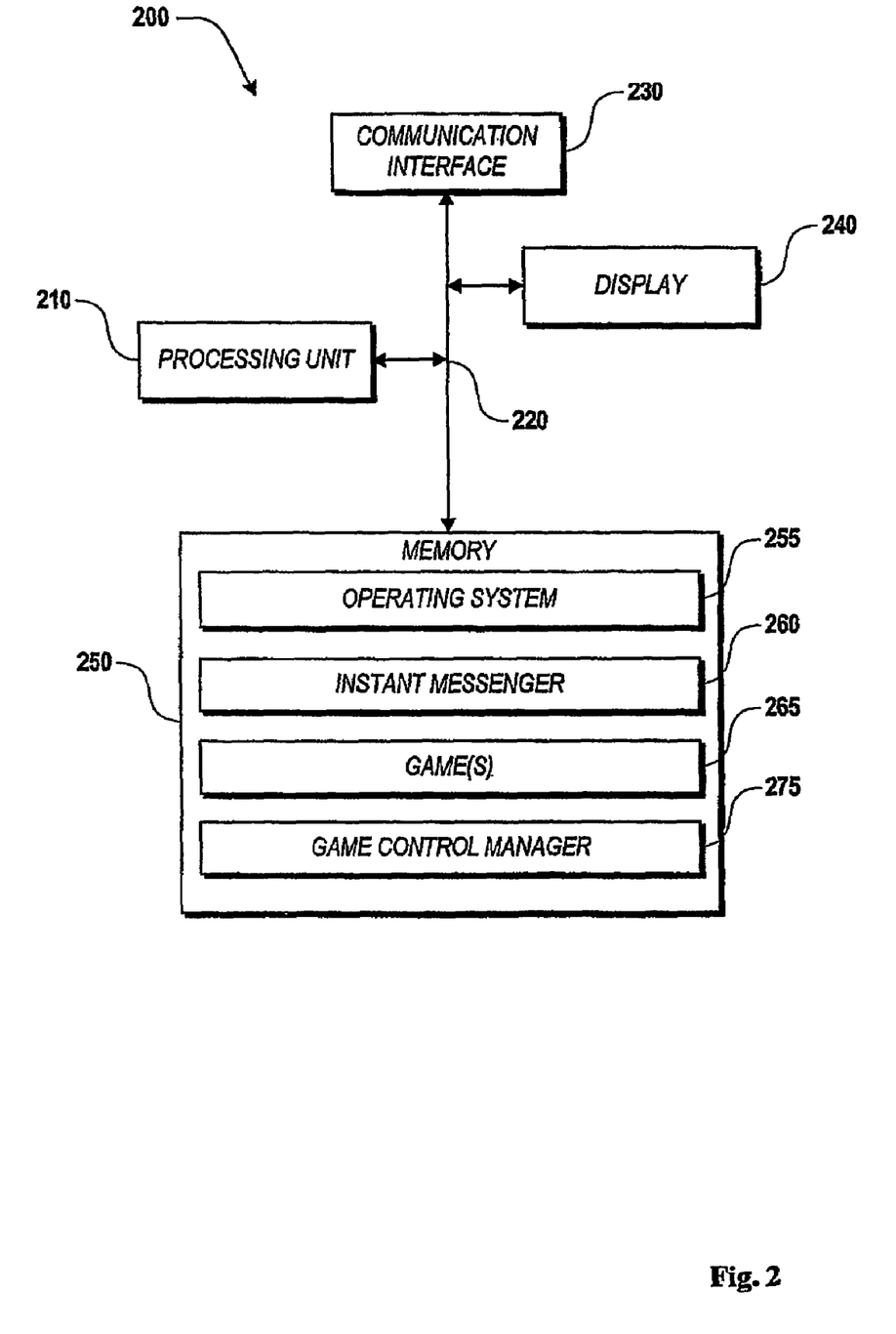
FIG. 2 illustrates an architectural view of a device suitable for use to implement the inviter device of FIG. 1, in accordance with one embodiment.

Referring now to FIG. 2, wherein an exemplary inviter device 200 suitable for use in an embodiment of the present invention, is illustrated. In alternate embodiments, inviter device 200 may include many more components (or less) of those shown in FIG. 2. However, it is not necessary that all of these generally conventional competing components be shown in order to disclose an enabling embodiment for practicing the present invention. As shown in FIG. 2, inviter device 200 includes a communications interface 230, which, in some embodiments of the present invention, may be a Network Interface Controller ("NIC"). The inter-device communications of the communications interface 230 may be designed to support a local area network, wide area network, personal area network, telephone network, power line network, serial bus or wireless connection. Such a communications interface 230 would also include the necessary circuitry, driver(s) and/or transceiver for such a connection and would be constructed for use with the appropriate transmission protocols for such connections.

The inviter device 200 also includes a processing unit 210, a display 240 and a memory 250, all interconnected along with the communications interface 230 via a bus 220. The memory 250 generally comprises a random access memory ("RAM"), a read only memory ("ROM") and a permanent mass storage device, such as a disk drive, flash RAM or the like. The memory 250 stores an operating system 255, an instant messenger 260, a game 265, and a game control manager ("GCM") 275. Further, for the embodiments, beside game control, such as catalog and related functions, GCM 275 includes, in particular, the invitation management function. In alternate embodiments, the invitation management function may be implemented standalone or with other functions. In various embodiments, bus 220 may be a hierarchy of bridged buses.

While for ease of understanding, operating system 255, instant messaging server 260, and GCM 275 are illustrated as separate software components, with invitation management function being described as integrally implemented with GCM 275, in alternate embodiments, they may be comprised of multiple software components, implemented in hardware, or may be subparts of one or more integrated software components.

It will be appreciated that the software components may be loaded from a computer readable medium into memory 250 using a mechanism (not shown) associated with the computer readable medium such as a floppy, tape, DVD (Digital Versatile Disk)/CD (Compact Disk)-ROM drive, flash RAM or communications interface 230. In various embodiments, the loading may be performed during the manufacturing of device 200, or in the field. In other embodiments, the software components may be downloaded from one or more networked servers.

In various embodiments, the communications interface 230 may facilitate the connection of remote devices to the inviter device 200. For example, devices for reading and/or writing in machine readable media, digital cameras, printers, digital music players/recorders (such as MP3 players, etc.), Smart appliances, televisions, and the like. Various input mechanisms may also be coupled to the inviter device 200, such as, for example, keyboards and/or mice (not shown).

In embodiments of the present invention, the inviter device 200 initiates a gaming session at the inviter device 200 but "invites" (e.g., sends an IM message to) a recipient device 150 to participate in the gaming session. Both inviter device 200 and recipient device 150 may or may not be an owner of the game.

Figure 3:
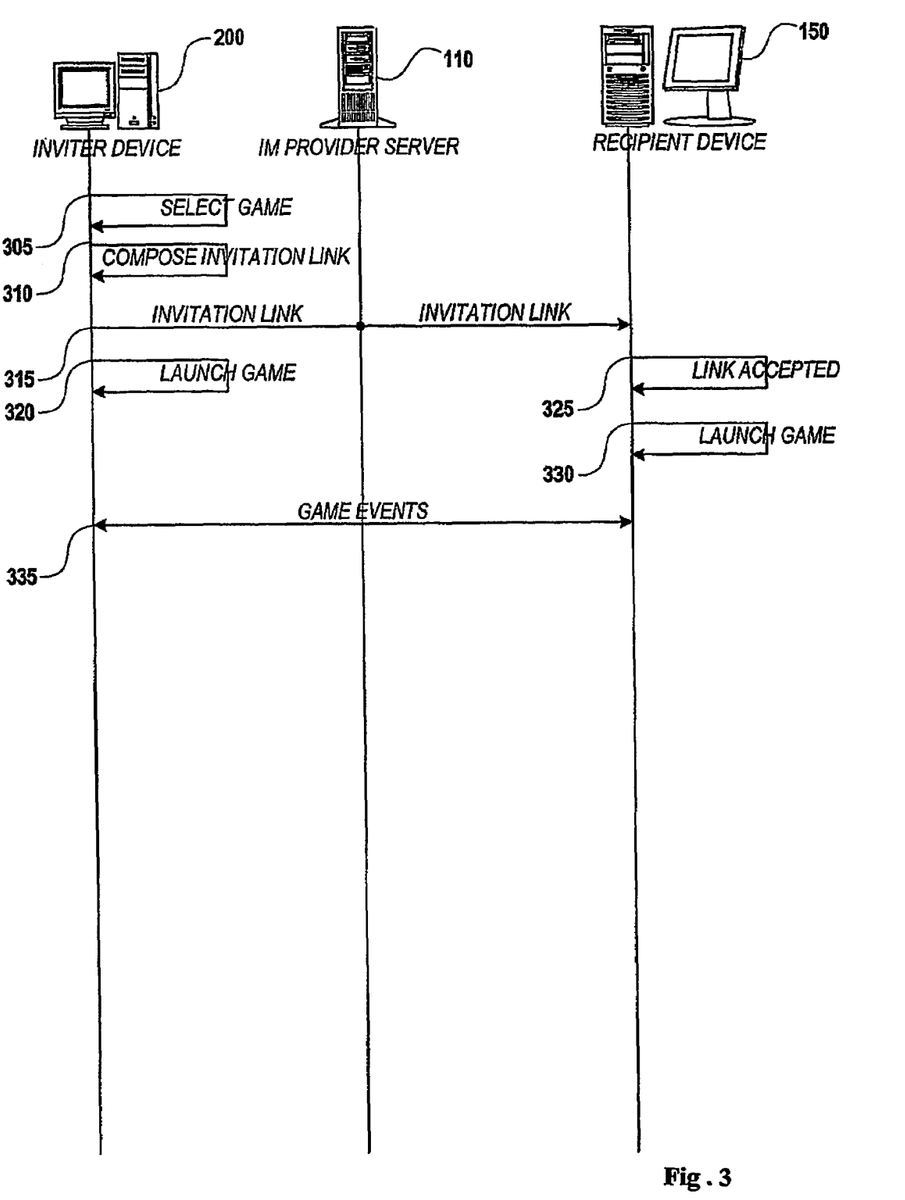
FIG. 3 illustrates an overview of the protocol and methods for the various devices of FIG. 1 to interact with one another, in accordance with one embodiment.

FIG. 3 illustrates one exemplary series of application level communications between an inviter device 200, an IM service provider 110, and a recipient device 150 in accordance with various embodiments. The embodiment shows the flow of a communication protocol, including the parameters, for operating environment 100 without the employment of relay server 120 (which may also be referred to as a peer-to-peer connection topology). In this embodiment, as described in the copending US04/22709 PCT application, if the invitation is allowed to go through to recipient device 150, a session ID is also sent (concurrently or subsequently) from the inviter device 200 to the recipient device 150 via an IM message, through IM provider server 110. Thereafter, the game client is launched on both machines with the session ID. At that point, the clients make a direct connection to each other. The specific communications between the devices are described in more detail below and shown in FIG. 3.

In FIG. 3, the gaming session begins with a game selection 305 by a user. Next, the user of inviter device 200 attempts to compose and send 310 an invitation link to the gaming session for the recipient device 150. In response, the invitation management function determines whether inviter device 200 is eligible to extend the invitation.

Figure 4:
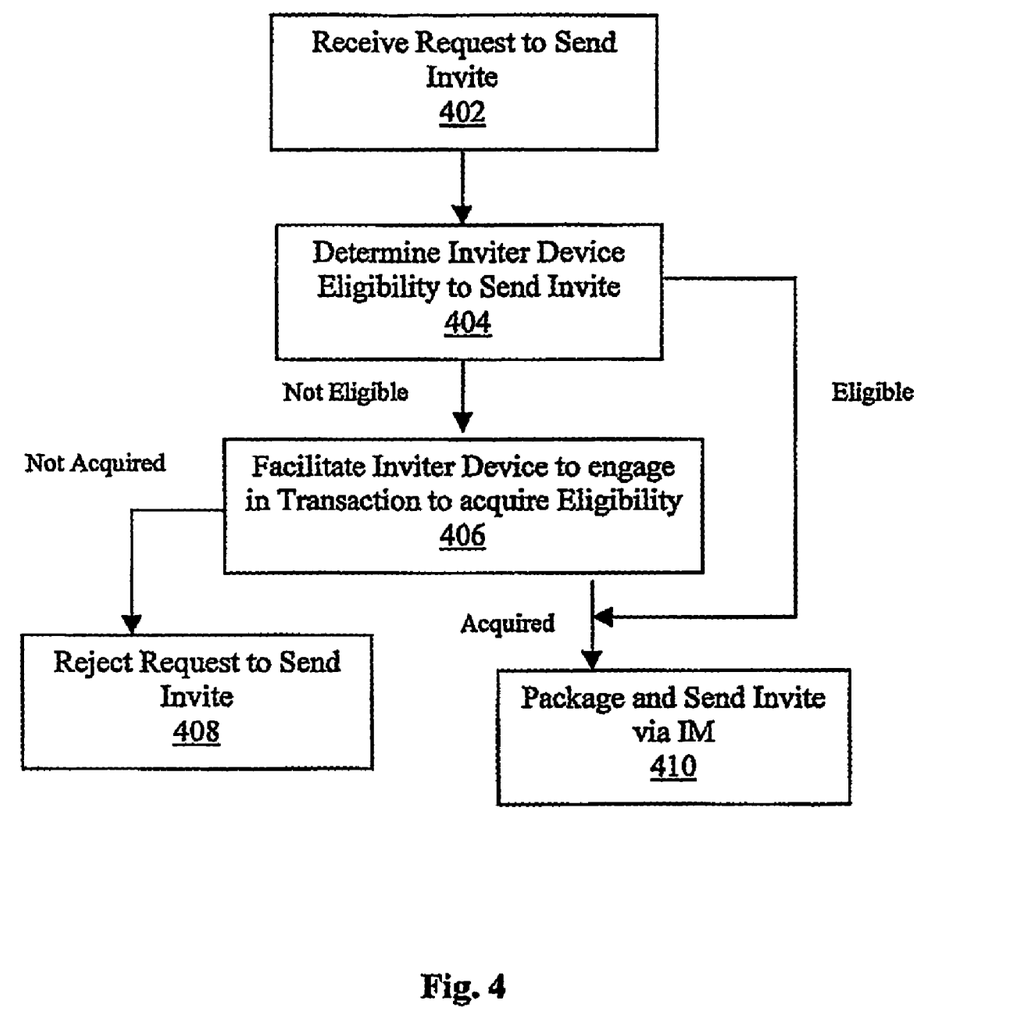
FIG. 4 illustrates the operational flow of relevant aspects of a process at the inviter device for managing joint consumption of content invitations, in accordance with one embodiment.

Referring now also to FIG. 4, on receipt of the user's attempt to send the invitation, the invitation management function determines 404 whether inviter device 200 is eligible to invite recipient device 150 to participate in the online multi-user game. In various embodiments, the invitation management function determines 404 whether inviter device 200 is eligible, based on whether inviter device 200 has reached an invitation limit. In various embodiments, multiple invitation limits are dependent on e.g. a ownership status of inviter device 200. Ownership status may be dependent on an amount of currency inviter device 200 tendered for the ownership, and/or other factors. Additionally, the invitation limit or limits may be for a time period, and/or invitee based.

For examples, in some embodiments, inviter device 200 may invite each of four different recipient devices 150 up to two times per day, if the inviter device 200 owns the game at a first ownership level, and invite each of eight different recipient devices 150 up to four times per week, if the inviter device 200 owns the game at a second ownership level, and so forth. Presumably, the second ownership accords more invitation privilege than the first ownership level.

Still referring to FIG. 4, for the embodiment, on determining 404 that inviter device 200 is not eligible to extend the invitation, the invitation management function facilitates a distribution server (not shown) of the game to offer 406 to inviter device 200 to engage in an electronic transaction that would result in inviter device 200 in an ownership status for the game, having the requisite eligibility. For example, if inviter device 200 is currently not an owner of the game, the "distribution" server may offer 406 inviter device 200 to acquire ownership of the game at an initial ownership level (assuming the game may be owned at different ownership level, providing e.g. different play levels). As a further example, if inviter device 200 is an owner of the game at a relatively low privilege level, the "distribution" server may offer 406 inviter device 200 to acquire a relatively higher privilege ownership level (assuming the same of the game). The transaction may e.g. be implemented in the form of a web based e-commerce transaction.

In various embodiments, if inviter device 200 is not eligible, and declines to engage in the necessary electronic transactions with the "distribution" server to provide inviter device 200 with the requisite eligibility, or the inviter device 200 fails to provide the necessary currency to receive the ownership that confers the requisite eligibility, the invitation management function rejects 408 the request to extend the invitation to recipient device 150.

Referring back to FIG. 3, assuming inviter device 200 has the requisite eligibility, the invitation link is encapsulated within an IM message and sent via the IM provider server 110 to the recipient device 150. On receipt, IM provider server 110 forwards 315 the invitation link to recipient device 150.

Concurrently, or shortly thereafter, the inviter device may launch 320 the subject game for which the invitation was sent to the recipient device 150. In various embodiments, the game may be executing on inviter device 200, or recipient device 150 or both.

The invitation link may include a uniform resource locator ("URL") pointing to the location of the game with the parameters necessary to launch the game (e.g., the required session ID). A similar link may be used to launch the game on the inviter device 200, potentially with additional parameters (e.g. that this game client instance will be the host). In both situations, this means that the game does not necessarily need to be installed on either the recipient device 150 or inviter device 200 before the invitation is composed and sent. Also, the fact that the link is a URL means that the invitation does not need to be distinctly supported by the IM protocol used by the instant messaging server 260 of inviter device 200.

Meanwhile, at the recipient device 150, the game invitation link is accepted 325 and in due course, the game is launched 330 on one or both of devices 150 and 200. With one or both the inviter device 200 and the recipient device 150 executing the game, the recipient device 150 and the inviter device 200 exchange game event data 335 to commence and play the gaming session.

In various embodiments, the communications described above and shown in FIG. 3 are merely one exemplary set of communications between the inviter device 200, IM provider service 110 and the recipient device 150. Other communications, both more and fewer, may be employed in other embodiments.

In various embodiments, the communications are performed using an IM protocol. In other embodiments, different transmission protocols for gaming sessions may be employed. The exact type-of gaming protocol employed is not significant to embodiment of the invention.

In general, the various embodiments, the invitation link contains the information necessary to connect players before any game clients are launched. This may be accomplished by two separate but similar ideas: the earlier described session ID and the reservation ID. The choice between the two may be determined by the network topology a given game uses. The session ID may be used for games where players connect to each other in a peer-to-peer fashion, as described earlier. In particular, the inviter device 200 could be the host and the recipient device 150 would connect directly to the host. The reservation ID may be used if a Relay Server 120 (see FIG. 5, and description below) or a Central Game Server 130 is present (see FIG. 6 and description below).

As described in the copending US04/22709 PCT application, the generation of the two ID types may follow industry standard practices, as long as they were unique for the participants of the IM conversation. One method for generating IDs is to take the IM screen name (assumed to be unique) of the inviter and append a random number (e.g. "Joe9375873934"). Another method is to generate a GUID (Globally Unique Identifier), using well-known algorithms. The location of ID generation may be determined by whether the game control manager (GCM) of the inviter device 200 is an active program that runs on the inviter device 200 or not. If so, the appropriate ID would be generated on demand when the user selects a game to play. If the GCM is a collection of static links provided by a web server, the IDs would be generated beforehand while creating the GCM itself.

In various embodiments, if the GCM of the inverter device 200 is a static collection of links, the inviter device's address (e.g., Internet Protocol address) might not be available in a reliable fashion for peer-to-peer games (e.g. the user is behind a network address translation ["NAT"] device). In one embodiment, session IDs are then used in conjunction with a Relay Server 120 in order to establish reliable connections between participants. In such an embodiment, the Relay Server may provide two services in order to accomplish this—IP Exchange and Data Relay. The devices (also referred to as Clients in this context) may connect to the Relay Server using standard Internet protocols (e.g. TCP/IP). The IP Exchange may be used for game clients to translate a given session ID into a collection of IP Addresses for all participants. Since the session ID is unique to a given IM Conversation, and reasonably random in generation, only the appropriate clients will have access to these IP Addresses. After the IP Addresses have been exchanged, the clients will attempt to make a direct connection to a designated host. If the connection was not successful, they may rely on the Relay Server to proxy data between the clients. In one embodiment, the Relay Server does not contain any game logic and only ferries the data, ignorant of its meaning. If the GCM is an active application, and can figure out the IP Address of the inviter, that information can be appended to the invitation link. In that case, the relay server 120 would only be used in the case that the clients could not directly connect to the host. The Relay Server and direct connections to the host can be used in combination to transmit data between all participants.

Figure 5:
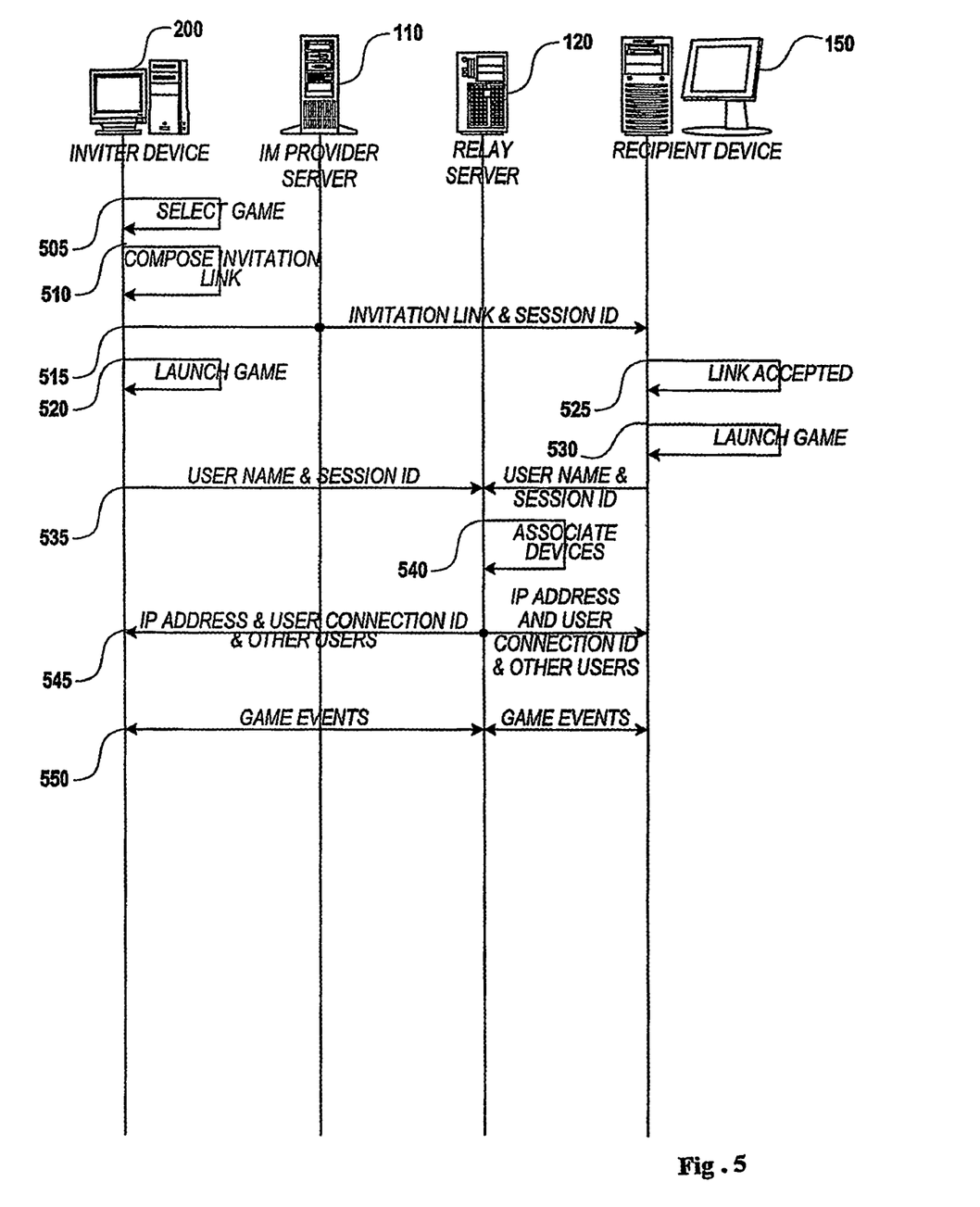
FIG. 5 illustrates an overview of an alternate protocol and methods for the various devices of FIG. 1 to interact with one other, in accordance with another embodiment.

Accordingly, FIG. 5 illustrates a similar gaming session to the one shown in FIG. 3, however using a Relay Server 120. In FIG. 5, in like manner, the gaming session begins with a game selection 505. Next, a user of the inviter device 200 attempts to compose and send 510 an invitation link to the gaming session for the recipient device 150. As with the embodiment of FIG. 3, on receipt 402 of the attempt, the invitation management function determines whether inviter device 200 is eligible to extend the invitation.

As before, if the inviter device 200 is determined to be not eligible to extend the invitation, the invitation management function facilitate a "distribution" server of the game to offer 406 to inviter device 200 to engage in an electronic transaction to place inviter device 200 at a new ownership level that provides the requisite eligibility. If inviter device 200 declines to engage in the necessary electronic transactions with the "distribution" server to provide inviter device 200 with the requisite eligibility, or the inviter device 200 fails to provide the necessary currency to acquire the ownership that confers the requisite eligibility, the invitation management function rejects 408 the request to extend the invitation to recipient device 150. On the other hand, either on determining or causing inviter device 200 to acquire the requisite eligibility, the invitation link is encapsulated within an IM message and sent via the IM provider server 110 to the recipient device 150. On receipt, IM provider server 110 forwards 410 the invitation link to recipient device 150.

Continue to refer to FIG. 5, concurrently, or shortly thereafter, the inviter device 200 may launch 520 the game for which an invitation was sent to the recipient device 150: As described earlier, the game may execute on the inviter device, the recipient device or both.

Meanwhile, at the recipient device 150, the game invitation link is accepted 525 and another copy the game may also be optionally launched 530 on the recipient device 150. With one or both the inviter device 200 and the recipient device 150 executing the game, both the recipient device 150 and the inviter device 200 send 535 their user names and session IDs to the relay server 120. The relay server 120 associates 540 all the user names with the same session IDs as part of the same game session. Next, the relay server 120 returns access data 545 (e.g., IP address and connection IDs) along with a list of current user names to each of the inviter device 200 and recipient device(s) 150. The recipient device(s) 150 and inviter device 200 respond with game event data 550 back to the relay server 120 to commence and play the gaming session.

In various embodiments, the communications described above and shown in FIG. 5 are merely one exemplary set of communications between the inviter device 200, the IM provider server 110, the relay server 120 and the recipient device 150. Other communications, both more and fewer, may be employed in other embodiments.

As described earlier, Central Game Server(s) 130 may be used in the case of games that have true client/server topologies, and game logic is run on the game server to facilitate play. Games of this variety may use reservation IDs for invitations that are sent via an Instant Message. The reservation ID provides clients a facility to designate a location to meet "within" the Central Game Server. The clients provide the reservation ID to the central game server when a connection is established. If that reservation ID is currently in use, the Central Game Server 130 will provide all the necessary routing information for the client to navigate to it. If the reservation ID is not currently in use, the central game server will create a new instance of that game and then provide the routing information. This allows the clients to connect in any order and still arrive at the same "location." In addition, the reservation ID can be queried from the central game server during game play, such that an invitation can be composed while the game is already in progress. Again, the reservation ID is generated in a manner that ensures only participants in the IM conversation should have access to the game instance.

In the central game server embodiment, a reservation ID is sent from the inviter device 200 to the recipient device 150 via an IM message. The game is launched on both machines with the reservation ID. The reservation ID is sent to the central game server 130 at connect time. The central game server 130 will provide routing information to let the client navigate to the: correct game instance. It will also create the game instance as needed. After both clients navigate directly, the central game server 130 will perform game logic and be sending/receiving game play data. The specific communications between the device are shown in FIG. 6 and describe below.

Figure 6:
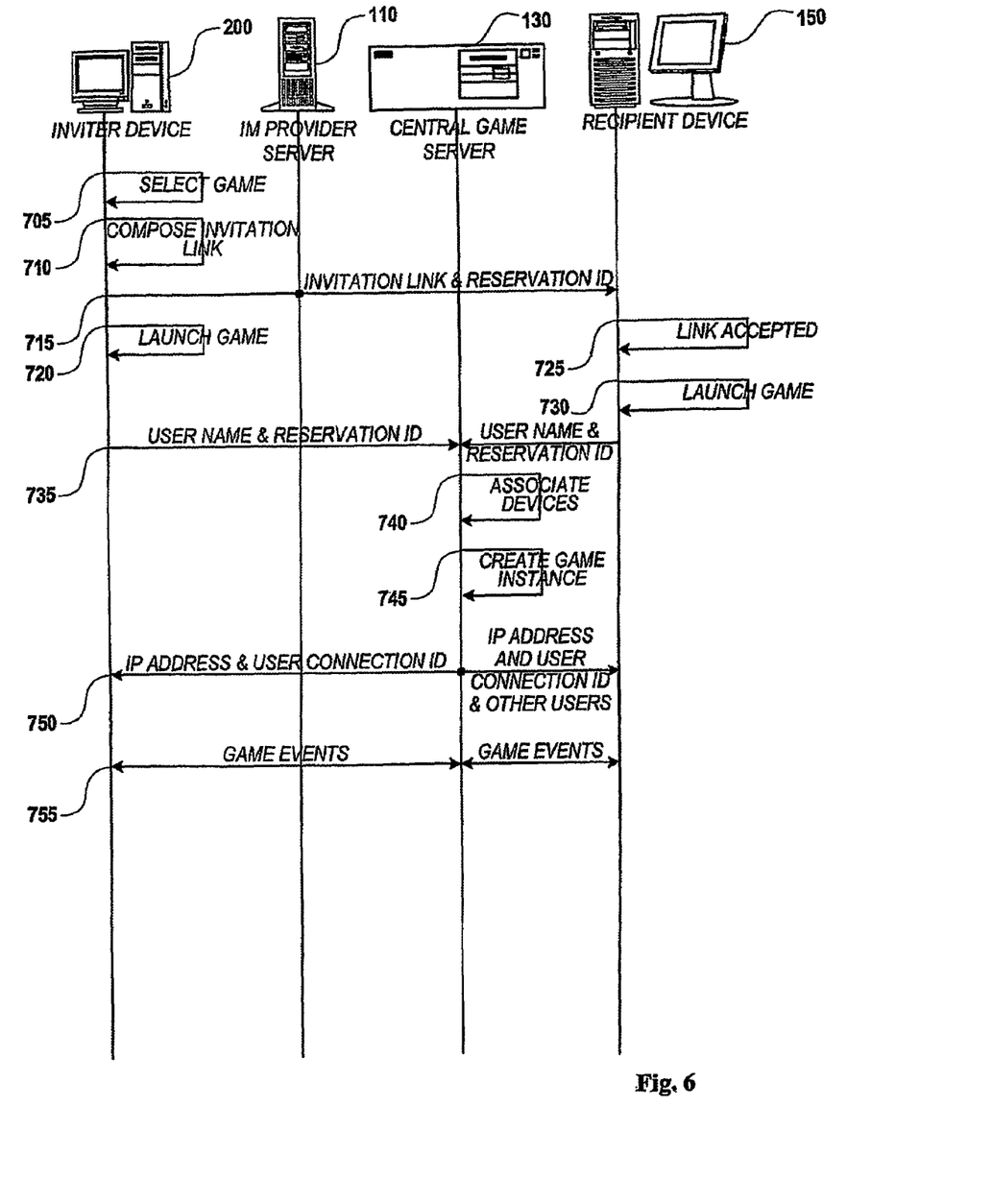
FIG. 6 illustrates an overview of an alternate protocol and methods for the various devices of FIG. 1 to interact with one another, in accordance with yet another embodiment.

In FIG. 6, where one embodiment of the communication protocol is illustrated, the gaming session begins with a game selection 705. Next, a user of the inviter device 200 attempts to compose and send 710 an invitation link with a reservation ID to the gaming session for the recipient device 150. As described earlier with reference to FIG. 4, on receipt 402 of the attempt, the invention management function determines 404 whether inviter device 200 is eligible to extend the invitation. If not, the invention management function facilitates a "distribution" server of the game to offer 406 inviter device 200 to engage in an electronic transaction to place inviter device 200 at a new ownership level that provides the requisite eligibility.

If inviter device 200 declines to engage in the necessary electronic transactions with the "distribution" server to provide inviter device 200 with the requisite eligibility, or the inviter device 200 fails to provide the necessary currency to acquire the ownership that confers the requisite eligibility, the invitation management function rejects 408 the request to extend the invitation to recipient device 150. On the other hand, on determining or causing inviter device 200 to acquire the requisite eligibility, the invitation link is encapsulated within an IM message and sent 715 via the IM provider server 110 to the recipient device 150. On receipt, IM provider server 110 forwards 710 and extends the offer to recipient device 150.

Concurrently, or substantially thereafter, the inviter device 200 optionally launches 720 a "thin" client of the game for which an invitation was sent to the recipient device 150.

Meanwhile, at the recipient device 150, the game invitation link is accepted 725 and another "thin client" of the game is launched 730 on recipient device 150. With both the inviter device 200 and the recipient device 150 executing the game, both the recipient device 150 and the inviter device 200 send 735 their user names and reservation IDs to the central game server 130. The central game server 130 associates 740 all the user names with the same reservation IDs as part of the same game session. The central game server 130 also creates 745 (or accesses and existing) game instance corresponding to the reservation ID. Next, the central game server 130 returns 750 access data (e.g., IP address and connection IDs) along with a list of current user names to each of the inviter device 200 and recipient device(s) 150. The recipient device(s) 150 and inviter device 200 respond with game event data 755 back to the central game server 130 to commence and play the gaming session.

In various embodiments, the communications described above and shown in FIG. 6 are merely one exemplary set of communications between the inviter device 200, the central game server 130 and the recipient device 150. Other communications, both more and fewer, may be employed in other embodiments.

When the inviter device 200 and all recipient devices 150 connect to the central game server 130 as clients, they would communicate a reservation ID from the invitation link, and the central game server 130 would direct them to a specific instance of the game hosted at the central game server 130. These reservation IDs can be generated before the games have been launched, or even installed. While an existing game is in progress, the appropriate reservation ID would be queried from the game instance and included in an invitation link.

In all or selected ones of the embodiments, inviter device 200 may also cause recipient device 150 to be temporarily accorded with the same functional level for a game. For example, the game may be adapted such that it will execute on a recipient device 150 temporarily based on the ownership level of the inviter device 200. For the embodiments of FIG. 3 and 5, where the games are correspondingly executed on the inviter device 200 and the recipient device 150, the ownership level of the inviter device 200 for the game may be conveyed to the game of recipient device 150, using an IM message, via IM provider server 110. Such provision may not be needed for the embodiment of FIG. 6, where the game is executed on Central Game Server 130.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A method of operation, to be performed on a computing device, the computing device being a selected one of an inviter computing device and a non-inviter service providing computing device, the method comprising:
   receiving a request to extend an invitation to a recipient computing device to join an inviter computing device to jointly consume a content online;
   determining whether the inviter computing device is eligible to extend the invitation, wherein the determining comprises determining whether the inviter computing device has reached an invitation limit; and
   extending the invitation to the recipient computing device, if it is determined that the inviter computing device is eligible to extend the invitation to the recipient computing device.

2. The method of claim 1, wherein the determining whether the inviter computing device is eligible to extend the invitation comprises determining whether the inviter computing device has reached an invitation limit for a time period.

3. The method of claim 1, wherein the determining whether the inviter computing device is eligible to extend the invitation comprises determining whether the inviter computing device has reached an invitation limit for inviting the recipient computing device to join the computing device to jointly consume the content online.

4. The method of claim 1, wherein the determining whether the inviter computing device is eligible to extend the invitation comprises determining whether the inviter computing device has reached an invitation limit for inviting the recipient computing device, within a time period, to join the inviter computing device to jointly consume the content online.

5. The method of claim 1, wherein if the computing device is the inviter computing device, the method further comprises engaging in an electronic transaction with a distribution computing device to provide the inviter computing device with the required eligibility to extend the invitation.

6. The method of claim 5, wherein the engaging comprises engaging in an electronic transaction that accords the inviter computing device an owner status for the content.

7. The method of claim 5, wherein the engaging comprises engaging in an electronic transaction that accords the inviter computing device a new ownership status, with more rights than a prior ownership status, for the content.

8. The method of claim 1, wherein the method further comprises providing the computing device ownership status to the recipient computing device.

9. The method of claim 1, wherein the extending is performed in accordance with an instant messaging protocol.

10. An article of manufacture, comprising a machine readable medium; and a plurality of executable instructions designed to enable a computing device to perform the method of claim 1.

11. A computing apparatus comprising:
a storage medium having stored therein a plurality of programming instructions adapted to receive a request to extend an invitation to a recipient apparatus to join an inviter apparatus to lointly consume a contact online, determine whether the inviter apparatus is eligible to extend the invitation, and extend the invitation to the recipient apparatus, if it is determined that the inviter apparatus is eligible to extend the invitation to the recipient apparatus, wherein the programming instructions are adapted to perform the determining by determining at least in part whether the inviter apparatus has reached an invitation limit; and
a processor coupled to the storage medium to execute the plurality of programming instructions.

12. The computing apparatus of claim 11, wherein the programming instructions are adapted to perform the determining whether the inviter apparatus is eligible to extend the invitation by determining whether the inviter apparatus has reached an invitation limit for a time period.

13. The computing apparatus of claim 11, wherein the programming instructions are adapted to perform the determining whether the inviter apparatus is eligible to extend the invitation by determining whether the inviter apparatus has reached an invitation limit for inviting the recipient apparatus to join the inviter apparatus to jointly consume the content online.

14. The computing apparatus of claim 11, wherein the programming instructions are adapted to perform the determining whether the inviter apparatus is eligible to extend the invitation by determining whether the inviter apparatus has reached an invitation limit for inviting the recipient apparatus, within a time period, to join the recipient apparatus to jointly consume the content online.

15. The computing apparatus of claim 11, wherein the computing apparatus is the inviter apparatus, and the programming instructions are further adapted to enable the inviter apparatus to engage in an electronic transaction that provides the inviter apparatus with the required eligibility to extend the invitation.

16. The computing apparatus of claim 15, wherein the programming instructions are adapted to enable the inviter apparatus to engage in an electronic transaction that accords the apparatus an owner status for the content.

17. The computing apparatus of claim 15, wherein the programming instructions are adapted to enable the inviter apparatus to engage in an electronic transaction that accords the apparatus a new ownership status, with more rights than a prior ownership status, for the content.

18. The computing apparatus of claim 11, wherein the programming instructions are further adapted to provide the inviter apparatus' ownership status to the recipient apparatus.

19. The computing apparatus of claim 11, wherein the programming instructions are further adapted to perform at least a selected one of the receiving and the extending, in accordance with an instant messaging protocol.

20. The computing apparatus of claim 11, wherein the computing apparatus is the inviter apparatus, the programming instructions are further adapted to implement a game and a game control manager.

21. The computing apparatus of claim 11, wherein the computing apparatus is the inviter apparatus, and the apparatus is an apparatus selected from a group consisting of a mobile phone, a personal digital assistant, a portable media player, a palm sized computer, a tablet computer, a laptop computer, a desktop computer, and a set-top box.

* * * * *

UNITED STATES PATENT AND TRADEMARK OFFICE
CERTIFICATE OF CORRECTION

PATENT NO. : 7,401,150 B2  Page 1 of 1
APPLICATION NO. : 10/572183
DATED : July 15, 2008
INVENTOR(S) : Shea et al.

It is certified that error appears in the above-identified patent and that said Letters Patent is hereby corrected as shown below:

Column 11
Line 21, "…to lointly consume…" should read --…to jointly consume…--.

Column 11
Line 21, "…a contact online…" should read --…a content online…--.

Signed and Sealed this

Twenty-seventh Day of January, 2009

JOHN DOLL
*Acting Director of the United States Patent and Trademark Office*